June 25, 1929. W. K. LIGGETT Re. 17,334

PULVERIZING MACHINE

Original Filed June 8, 1923

WITNESS:
S. L. Yost
Dudley T. Fisher

INVENTOR.
William K. Liggett
BY
Lenahan, Bryant & Dale
ATTORNEYS

Reissued June 25, 1929. Re. 17,334

UNITED STATES PATENT OFFICE.

WILLIAM KELSEY LIGGETT, OF COLUMBUS, OHIO, ASSIGNOR TO JEFFREY MANUFACTURING COMPANY, OF COLUMBUS, OHIO, A CORPORATION OF OHIO.

PULVERIZING MACHINE.

Original No. 1,621,938, dated March 22, 1927, Serial No. 644,165, filed June 8, 1923. Application for reissue filed April 27, 1929. Serial No. 358,742.

The present invention relates to certain new and useful improvements in pulverizing machines, and particularly to that class of pulverizing machines having an element adapted to revolve at high velocity and provided with a plurality of pivotally mounted radially extending arms adapted to engage and pulverize material, and a casing arranged to receive the material to be pulverized and retain it within the influence of the rapidly revolving arms until it shall be reduced to the desired degree of fineness.

The present machine is designed more particularly to reduce fibrous material, such as sugar cane and the like.

The especial object of this invention is to provide in a machine of the class described, improved means for holding material within the field of action of the rapidly revolving arms to be pulverized thereby.

A further object is to provide adjusting means for said holding means whereby the fineness of the product may be regulated.

These and other objects will be fully disclosed in the following specification, and illustrated in the accompanying drawings, of which—

Like numerals refer to similar parts in the several figures.

Figure 2:
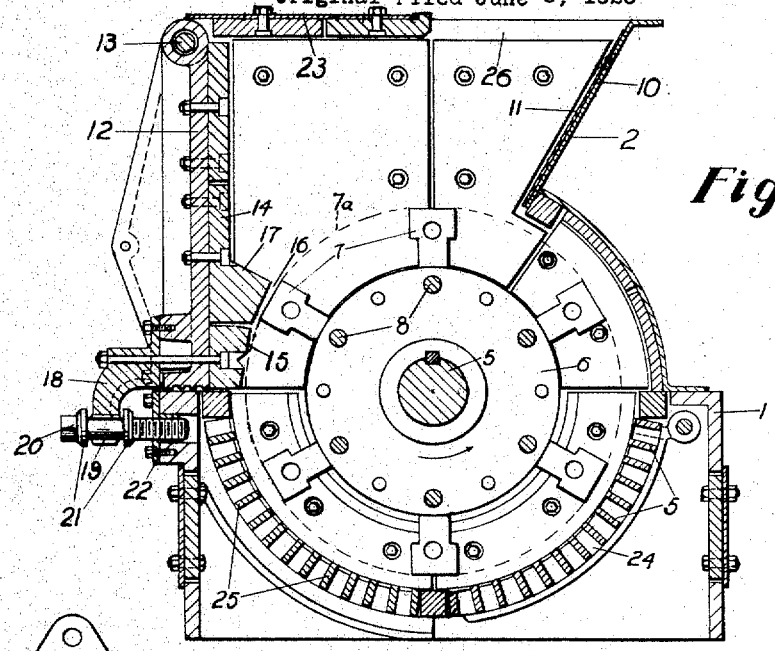
Fig. 2 is a cross section taken along the line II—II of Fig. 1.
Figure 3:
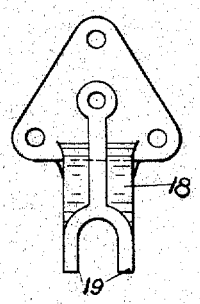
Fig. 3 is a detail of the devices shown in Figs. 1 and 2.
Figure 1:
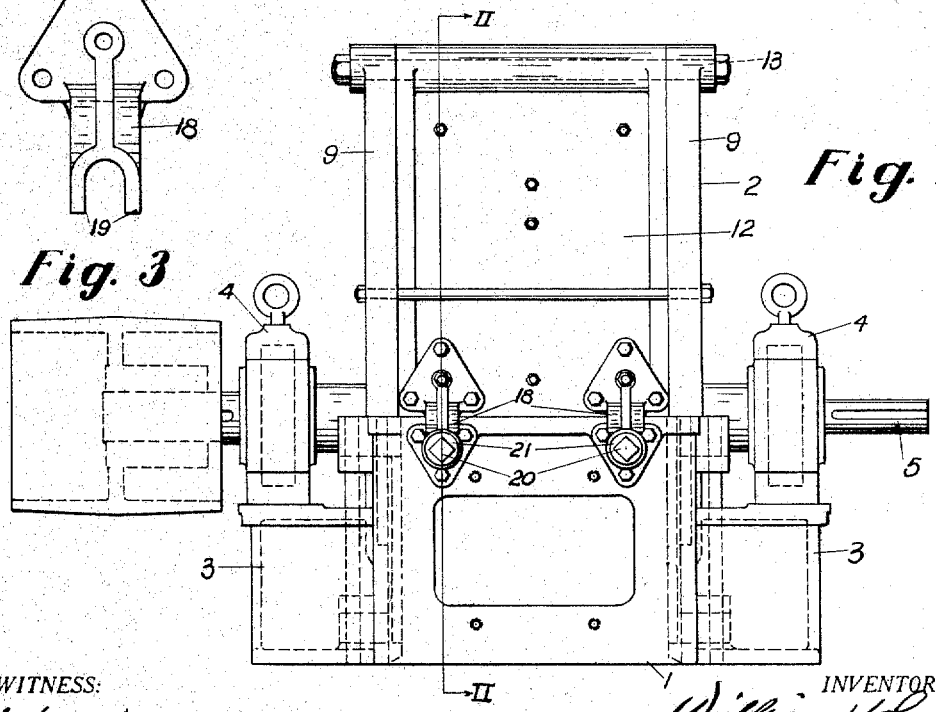
Fig. 1 is a side elevation of the preferred embodiment of my invention.

As shown in the drawings, my improved pulverizing machine consists of a rotor adapted to revolve at high velocity about a horizontal axis, and mounted within a casing which is adapted to confine the material during the process of pulverization. The casing comprises a main supporting frame 1 and a housing 2 which are joined together along the horizontal central plane of the rotor, and which enclose a pulverizing chamber. The main frame 1 consists of a hollow rectangular casting having longitudinally projecting brackets 3 upon which are mounted suitable journal bearings 4 in which the shaft 5 of the rotor is journaled. The rotor is of the well known construction comprising a plurality of discs 6 secured to the shaft 5 and these discs carry the pivot bolts 7 upon which the pulverizing arms 8 are mounted. When the rotor revolves at high velocity centrifugal force causes the arms 7 to project radially, and their outer ends generate a substantially continuous pulverizing surface $7^a$ upon which material to be pulverized will float during the process of pulverization.

The housing 2 comprises two end walls 9 to which are secured, in any preferred manner, the curved back wall 10 of the casing, and the sloping feed plate 11 along which material may slide into the field of action of the pulverizing surface generated by the revolving pulverizing elements. The front wall of the pulverizing chamber consists of a vertically extending plate 12 which is pivotally supported at its upper end upon the tie rod 13 which extends between the upper part of the side walls 9 to secure them in spaced relation. The plate 12 extends downwardly substantially to the central horizontal plane of the rotor, and its inner face is protected by the lining plates 14 and 15 which are preferably made of a highly refractory alloy of iron. The plates 14 and 15 are shaped on their outer faces to closely approach the pulverizing surface $7^a$, and thereby form a throat 16 through which pulverized material may pass. On the plate 14 there is formed a shelf 17 the upper surface of which lies in a plane extending radially of the rotor, and this shelf acts as an abutment to arrest forward movement of material floating upon the pulverizing surface, and it presents a relatively sharp edge upon which material will be broken by the action of the pulverizing surface in addition to its disintegration under the action of the pulverizing surface generated by the rotor. It will be seen that the abutment 17 inclines downwardly so that while it will arrest the unpulverized material and support it in position for action by the pulverizing elements 7, the tendency of the arrested mass will be always to feed downwardly into the field of action of the pulverizing surface generated by the elements 7. To the outer surface of the plate 14 are attached two brackets 18 which extend outwardly and downwardly, and are forked at their outer ends to form arms 19 which embrace the adjusting bolts 20. The bolts 20 are formed with two collars 21 adapted to engage the inner and outer surfaces of the arms 19, and they are screw threaded into nuts 22 fixed to the machine frame. By manipulation of the bolts 20 the plate 12 may be swung about the pivot rod 13 to move the lining plates 14 and 15 closer to or farther from the pulverizing surface, thereby adjusting the width of the throat 16 to control the size of the fragments of the product. A cover plate 23 attached to the end walls 9 of the housing, closes the forward part of the pulverizing chamber and serves to intercept material which may be thrown radially from the pulverizing surface. A grating 24 preferably composed of the longitudinally extending bars 25 is arranged below and in close proximity with the rotor and acts to retain material within the influence of the pulverizing surface until it is fully pulverized.

In operation fibrous material, such as sugar cane, ensilage, and the like, is fed through the opening 26, into the pulverizing chamber, and slides down the feed plate 11 to the pulverizing surface 7[a] upon which it floats, and by which it is carried forward to contact with the abutment 17. Fragments are then ground off of the mass by the pulverizing surface 7[a], carried through the throat 16 and are discharged between the grate bars 25. The size of the fragments thus ground off will vary with the width of the throat 16, and the character of the product may be varied by the adjustment of the plate 14 towards or from the rotor.

From the foregoing it will be seen that a pulverizing machine capable of handling fibrous and other materials, is provided, in which the mass of the material is maintained above the rotor and subjected to the pulverizing action of the reducing elements as the rotor revolves, without any danger of unpulverized material passing through the machine. The means for arresting the unpulverized material is so disposed that the material naturally gravitates to it, and the arresting means in turn naturally directs the unpulverized material to the rotor for further action. The throat formed by the curved face is so disposed relative to the rotor that only material which has been sufficiently pulverized will pass, and the means for adjusting the abutment and throat forming face enables me to adapt the machine to produce various sizes of material.

What I claim is:—

1. In a machine of the class described, the combination of a rotor provided with pulverizing elements which generate a substantially continuous pulverizing surface when the rotor is at speed; a casing of substantially cylindrical form closely surrounding the major part of said rotor; a combined hopper and pulverizing chamber above said casing with the hopper portion disposed on the upwardly advancing side and the pulverizing chamber on the downwardly advancing side of said rotor, said pulverizing chamber having a substantially vertical wall tangentially disposed relative to the path of rotation of said pulverizing elements; an abutment at the lower end of said vertical wall substantially filling the throat between the tangentially vertical wall and said rotor, to intercept the downwardly gravitating unpulverized material and prevent its passing through the machine; and means to adjust said abutment.

2. In a machine of the class described, the combination of a rotor provided with pulverizing elements which generate a substantially continuous pulverizing surface when the rotor is at speed; a casing of substantially cylindrical form closely surrounding the major part of said rotor; a combined hopper and pulverizing chamber above said casing with the hopper portion disposed on the upwardly advancing side and the pulverizing chamber on the downwardly advancing side of said rotor, said pulverizing chamber having a substantially vertical wall tangentially disposed relative to the path of rotation of said pulverizing elements, means for adjusting said wall toward and from the path of rotation of said pulverizing elements, and an abutment at the lower end of said vertical wall substantially filling the throat between the tangentially vertical wall and said rotor, to intercept the downwardly gravitating, unpulverized material and prevent its passing through the machine.

3. In a machine of the class described, the combination of a rotor provided with pulverizing elements which generate a substantially continuous pulverizing surface when the rotor is at speed; a casing of substantially cylindrical form closely surrounding the major part of said rotor; a combined hopper and pulverizing chamber above said casing with the hopper portion disposed on the upwardly advancing side and the pulverizing chamber on the downwardly advancing side of said rotor, said pulverizing chamber having a substantially vertical wall tangentially disposed relative to the path of rotation of said pulverizing elements; a swing mounting at the top of said wall; means for adjusting said wall on its swing mounting; and an abutment having a downwardly inclined upper face and a curved face below said inclined face closely adjacent the path of said pulverizing elements to fill the throat between the tangentially vertical wall and said rotor, to intercept the downwardly gravitating, unpulverized material and prevent its passing through the machine.

4. In a machine of the class described, the combination with a pulverizing rotor, a screen casing closely surrounding a major part of said rotor and having a pulverizing chamber, throat filling means at the forward side of said chamber to arrest and return to the pulverizing rotor unpulverized material, and means to adjust said material arresting means to and from the rotor.

5. In a machine of the class described, the combination of a pulverizing rotor, a screen casing closely surrounding a major part of said rotor and having a pulverizing chamber above said rotor, a throat filling abutment at the far side of the chamber having an upper surface inclined toward the rotor to arrest and return unpulverized material to the rotor, a curved face below said inclined surface closely adjacent the path of the rotor to form a throat for pulverized material, and means for adjusting said abutment and said curved face relative to said rotor.

6. In a machine of the class described, the combination of the pulverizing rotor, a screen casing closely surrounding a major part of said rotor and having a pulverizing chamber above said rotor, a movable wall at the far side of said chamber, a throat filling abutment projecting inwardly from said movable wall and having an upper surface inclined toward the rotor to arrest and return unpulverized material to said rotor, a curved face below said inclined surface arranged close to the path of rotation of said rotor to form a throat for the pulverized material, and means for adjusting said movable wall relative to said rotor.

7. In a machine of the class described, the combination of a pulverizing rotor, a screen casing closely surrounding a major part of said rotor and having a pulverizing chamber entirely above said rotor provided with a feed opening, a top for said chamber to prevent material being thrown out by the rotor, a pivoted wall at the far side of said chamber, a throat filling abutment projecting inwardly from said wall at a point below the top of said rotor and provided with a surface inclined inwardly toward said rotor to arrest and return unpulverized material to said rotor, a curved face below said inclined surface to form with said rotor a throat for the pulverized material, and adjusting means mounted on the wall of the casing and engaging the lower end of said pivoted wall to vary the position of said wall, abutment and curved face relative to said rotor.

8. In a machine of the class described, the combination of a rotor, a plurality of reducing elements disposed circumferentially of said rotor and which, when the rotor is in motion, generate a substantially continuous, revolving material-supporting surface; a hopper for the material to be reduced arranged above and closely embracing at its lower end said rotor to retain the material in floating condition on said rotor and to prevent oversize material passing between said rotor and the lower end of said hopper; and a hopper protecting lining having at its lower end a material-engaging abutment projecting in substantially radial lines close to the path of rotation of said rotor.

9. In a machine of the class described, the combination of a movable member, a plurality of reducing members carried by said member, and which, when the member is in motion, generate a substantially continuous, moving, material-engaging surface, a hopper for the material to be reduced closely embracing at its end, said movable member and reducing elements to retain the material in floating condition on said reducing member, and to prevent oversize material passing between said reducing elements and the end of said hopper, and a material engaging abutment projecting close to the path of movement of said reducing elements, said abutment being mounted for adjustment toward and away from said path of movement.

10. In a machine of the class described, the combination of a movable member, a plurality of reducing members carried by said member, and which, when the member is in motion, generate a substantially continuous, moving, material-engaging surface, a hopper for the material to be reduced closely embracing at its end, said movable member and reducing elements to retain the material in floating condition on said reducing member, and to prevent oversize material passing between said reducing elements and the end of said hopper, and a material engaging abutment projecting in substantially radial lines close to the path of rotation of said rotor, said abutment being mounted for adjustment toward and away from said path of movement.

11. In a machine of the class described, the combination of a movable member, a plurality of reducing members carried by said member, and which, when the member is in motion, generate a substantially continuous, moving, material-engaging surface, a hopper for the material to be reduced closely embracing at its end, said movable member and reducing elements to retain the material in floating condition on said reducing member, and to prevent oversize material passing between said reducing elements and the end of said hopper, and a material-engaging abutment projecting close to the path of movement of said reducing elements, said abutment being swingably mounted for adjustment toward and away from said path of movement.

12. In a machine of the class described, the combination of a movable member, a plurality of reducing members carried by said member, and which, when the member is in motion, generate a substantially continuous, moving, material-engaging surface, a hopper for the material to be reduced closely embracing at its end, said movable member and reducing elements to retain the material in floating condition on said reducing member, and to prevent oversize material passing between said reducing elements and the end of said hopper, and a material-engaging abutment projecting in substantially radial lines close to the path of rotation of said rotor, said abutment being swingably mounted for adjustment toward and away from said path of movement.

13. In a machine of the class described, the combination of a rotor; a plurality of reducing elements disposed circumferentially of said rotor and which, when the rotor is in motion, generate a substantially continuous, revolving material-supporting surface; a hopper for the material to be reduced arranged above and closely embracing at its lower extremities said rotor to retain the material in floating condition upon said rotor and to prevent oversize material passing between said rotor and the upper extremities; said hopper including a substantially vertical wall at its forward side, and an abutment extending transversely of said wall at its lower portion, said abutment having a top face extending in close proximity to said material-supporting surface, and a front face of substantially vertical extent lying closely adjacent and substantially conforming to said material-supporting surface.

14. In a machine of the class described, the combination of a rotor; a plurality of reducing elements disposed circumferentially of said rotor and which, when the rotor is in motion, generate a substantially continuous, revolving material-supporting surface; a hopper for the material to be reduced arranged above and closely embracing at its lower extremities said rotor to retain the material in floating condition upon said rotor and to prevent oversize material passing between said rotor and the upper extremities; said hopper including a substantially vertical wall at its forward side, and an abutment extending transversely of said wall at its lower portion, said abutment having a top face extending substantially radially in close proximity to said material-supporting surface, and a front face of substantially vertical extent lying closely adjacent and substantially conforming to said material-supporting surface.

15. In a machine of the class described, the combination of a rotor mounted for rotation about a horizontal axis; a plurality of reducing elements disposed circumferentially of said rotor and which, when the rotor is in motion, generate a substantially continuous, revolving material-supporting surface; a hopper for the material to be reduced arranged above and closely embracing at its lower extremities said rotor to retain the material in floating condition on said rotor and to prevent oversize material passing between said rotor and the lower end of said hopper; said hopper including a substantially vertical wall at its forward side, and an abutment extending transversely of said wall at its lower portion; said abutment having a front face extending upwardly a distance from adjacent the horizontal axial plane of the rotor in substantial conformity close to said material-supporting surface, and a top face sloped downwardly to said front face.

WILLIAM KELSEY LIGGETT.